United States Patent [19]
Yuan

[11] Patent Number: 5,921,118
[45] Date of Patent: Jul. 13, 1999

[54] SHIFT LEVER LOCK STRUCTURE OF A CAR

[76] Inventor: Li Chi Yuan, No. 740-7, Chung-Cheng Rd., Hsin-Chuang City, Taipei, Taiwan

[21] Appl. No.: 09/012,563

[22] Filed: Jan. 23, 1998

[51] Int. Cl.[6] .................................................. F16H 57/00
[52] U.S. Cl. ............................... 70/201; 70/247; 70/491; 70/360
[58] Field of Search .............................. 70/201, 192, 215, 70/210, 247, 491, 358, DIG. 31, DIG. 39, DIG. 27, 245, 246, DIG. 20, 360, 195, 197

[56] References Cited

U.S. PATENT DOCUMENTS

| | | | |
|---|---|---|---|
| 3,903,720 | 9/1975 | Scherbing | 70/363 |
| 3,916,657 | 11/1975 | Steinbach | 70/338 |
| 4,977,768 | 12/1990 | Embry | 70/491 |
| 5,018,376 | 5/1991 | Lee | 70/491 |
| 5,020,349 | 6/1991 | Lee | 70/491 |
| 5,546,775 | 8/1996 | Lee | 70/201 |
| 5,596,894 | 1/1997 | Lee | 70/201 |
| 5,765,413 | 6/1998 | Jung | 70/201 |
| 5,809,813 | 9/1998 | Wang | 70/201 |

*Primary Examiner*—Steven Meyers
*Assistant Examiner*—John B. Walsh
*Attorney, Agent, or Firm*—Bacon & Thomas

[57] ABSTRACT

The present invention relates to an improved shift lever lock structure of a car, wherein, a lock core and an upper and a lower bead seat are placed in from the front end of the housing of the lever lock, the lock core is extended through a through hole on the wall of the housing, then a C shaped ring and a moving sheet set for the lock are mounted on and secured, a movable side pin is transversely provided on the upper bead seat, it can be pushed to open the lock when a key is inserted, the lock core is very difficult to be destroyed from the front end thereof, thus an additional safety is provided.

2 Claims, 6 Drawing Sheets

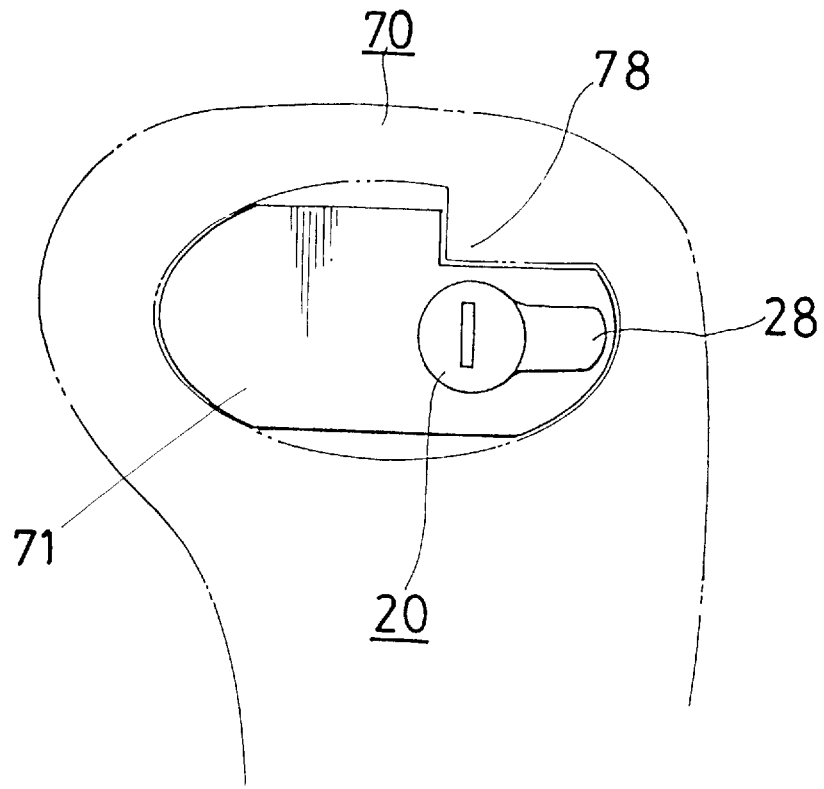
Fig. 9
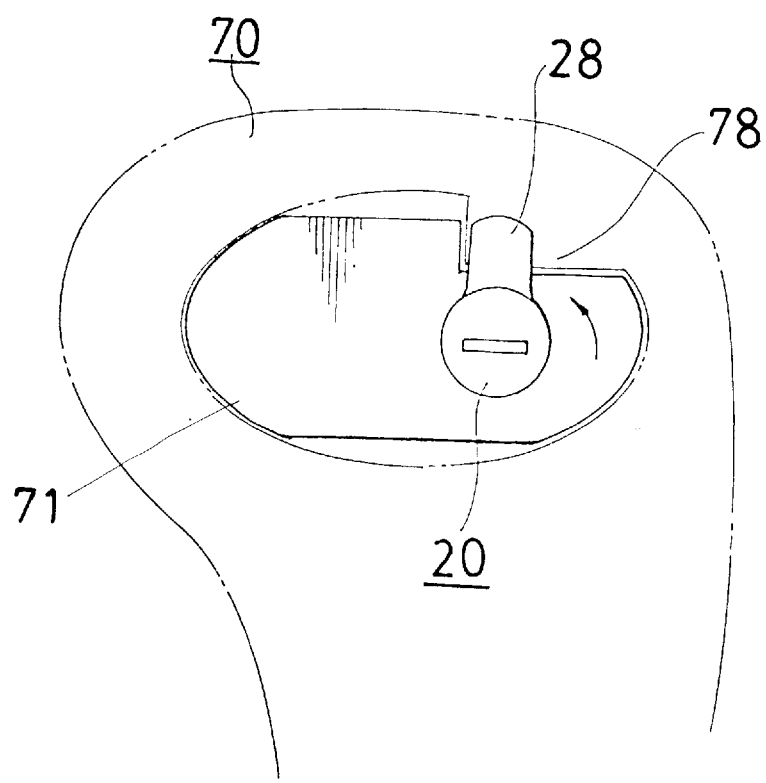

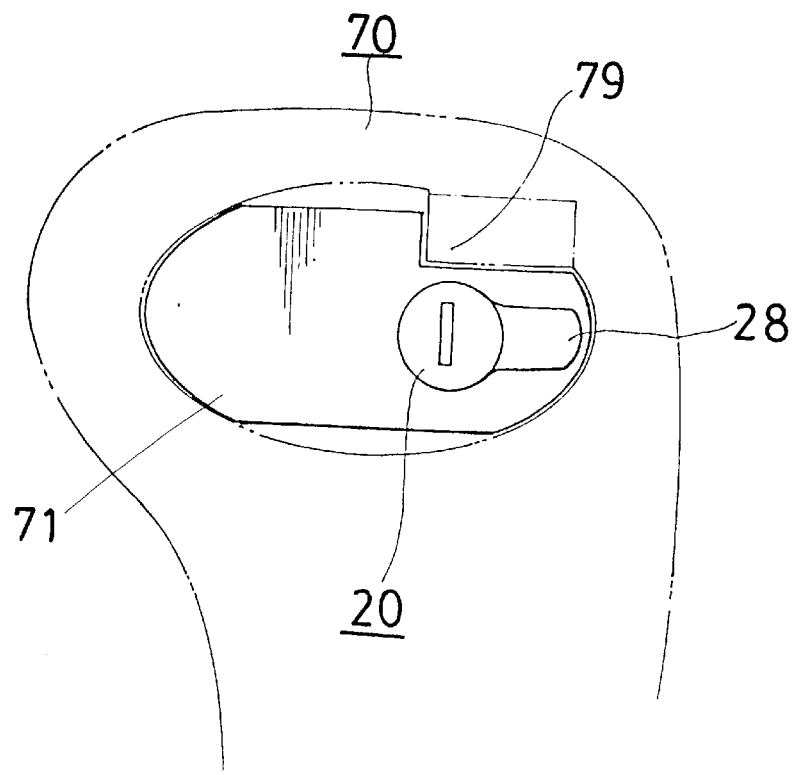
Fig. 10
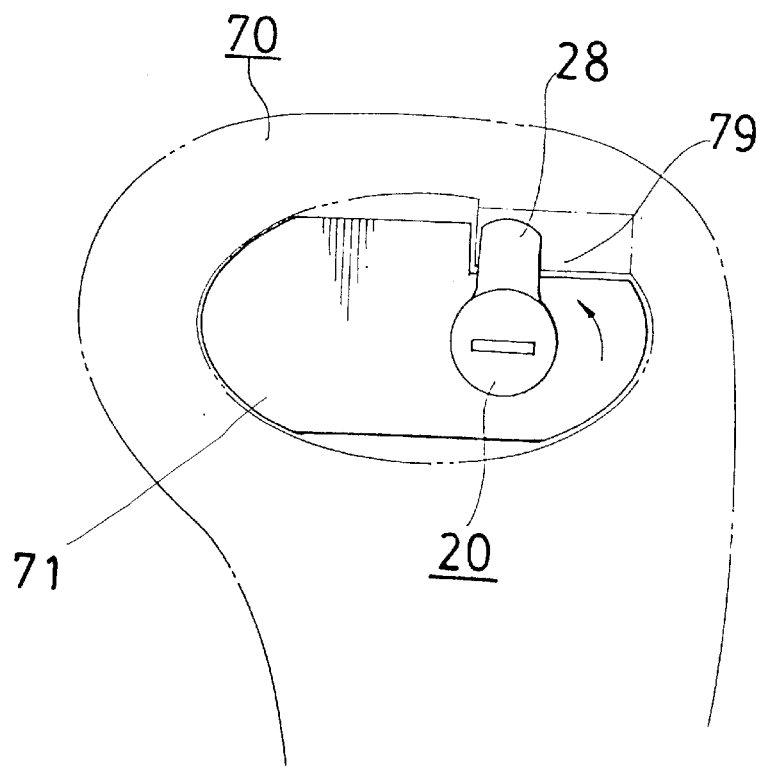

SHIFT LEVER LOCK STRUCTURE OF A CAR

BACKGROUND OF THE INVENTION

1. Field of the Invention

The present invention relates to an improved shift lever lock structure of a car, it is directed mainly against the fact that components of a conventional shift lever lock are mostly installed from the rear end toward the front end of a lock, so that a thief can extend a sharp article from the key hole on the front face of the lock and makes a rapping to extrude the members in the lock out of the rear end of the lock, and hence the conventional shift lever lock is not good in safety. In this view, the present invention has the structure of the lock improved to have the members installed from the front end, so that the lock is very difficult to be opened by rapping of a thief from the front thereof, a movable side pin rounded is provided in the lock, the lock must be unlocked with a special key, and even can not be opened with a master key by a thief, and this is the main spirit of the present invention.

2. Description of the Prior Art

A conventional lock is depicted in FIG. 11, the lock has a housing 80 which is provided with a relatively narrow key hole 801, an entrance is provided on the rear end for installing parts, an upper bead seat 84 and a plurality of upper locking beads 82 are placed in the housing 80, a stub 83 in the front of the upper bead seat 84 can be protruded from the key hole 801, while a lock core 841 at the rear of the upper bead seat 84 is protruded out of the housing 80, a lower bead seat 87 provided therein with a plurality of lower locking beads 85 and springs 86 is slipped over the lock core 841 and is mounted in the housing 80, and a fixing pin 81 is extended in from outside of the housing 80 to secure the lower bead seat 87, the lock core 841 is provided thereon with a moving sheet set 88 for the lock, which set includes a plurality of moving sheets and nuts and forms the lock, a key is provided on the end thereof with arciform grooves of different lengths, so that when the key 90 is inserted into the key hole 801, the end arciform groove can abut on one end of each of upper locking beads 82, while the other end thereof can abut on the lower locking beads 85. When the contact area of the upper and the lower locking beads 82, 85 is exactly between the upper and the lower bead seats 84, 87, the key 90 can move the upper bead seat 84 and in turn move the lock core 841 and the moving sheet set 88.

However, such a lever lock has its components installed from the rear end of the housing 80 of the lock, and leaves a chance for a thief to extend a sharp article, such as a chisel, from the key hole 801 on the front face of the lock and makes a rapping onto the central stub 83, the upper bead seat 84 and the lock core 841 are collided to cut down the fixing pin 81 and to extrude the members in the lock out of the rear end of the lock, and hence strength of the conventional shift lever lock is not adequate.

Further as shown in FIG. 11, a master key 91 which is a powerful tool used by a locksmith or a thief for opening pipe shaped locks is provided therearound a plurality of movable pushing needles 93 which each is provided on one end thereof with a pushing block 92, when the pushing blocks 92 are pressed to move, the other ends of the movable pushing needles 93 can be moved too, thereby when the master key 91 is inserted into the key hole 801, the pushing blocks 92 are pushed and in turn the movable pushing needles 93 are pushed and tested for their individual appropriate extended lengths for getting in position of the upper and lower locking beads 82, 85, then the lock can be unlocked, this is the way that the conventional locks are subjected to being unlocked and lack of safety.

SUMMARY OF THE INVENTION

In view of the disadvantages resided in the conventional locks, the inventor of the present invention provides a lock structure which is stronger and is safer and can solve the problems of the conventional structure of the pipe shaped locks.

Therefore, the primary object of the present invention is to provide a lock wherein the wall of an upper bead seat is provided with a pushing rod which can rotate an upper bead seat and a lock core, the lock core is further provided thereon with a stop sheet, when the lock is placed in the lock core hole of a push button, the pushing rod is exactly located in a notch of the push button, while the stop sheet is extended out from a slit on the push button; when the pushing rods are pressed, they rotate the upper bead seat and the lock core, so that the stop sheet secured on the lock core can be rotatably moved to a stop block (or into a groove) to prevent the push button from being pressed down, and thus an object of locking can be achieved.

Another object of the present invention is to provide a safer lock, wherein, the wall of the upper bead seat is provided with a plurality of transverse pin holes, the push button is provided at a plurality of corresponding positions thereon with a plurality of arciform grooves, a plurality of pins which are rounded on both ends thereof are provided in the pin holes and the arciform grooves, the key for the lock is provided correspondinly to the pin holes a plurality of round grooves, these pins normally are located between the annular wall and the housing to prevent the bead seats from rotating, when the key is inserted, the pins can be moved to rotate the locking beads, this makes the lock safer.

The present invention will be apparent in the particular structure, characteristics and objects thereof after reading the detailed description of the preferred embodiment thereof in reference to the accompanying drawings.

BRIEF DESCRIPTION OF THE DRAWINGS

FIG. 9 is a schematic view showing a stop sheet engaging in a knob of the present invention;

FIG. 10 is another schematic view showing the stop sheet engaging in the knob of the present invention;

DETAILED DESCRIPTION OF THE PREFERRED EMBODIMENT

Figure 1:
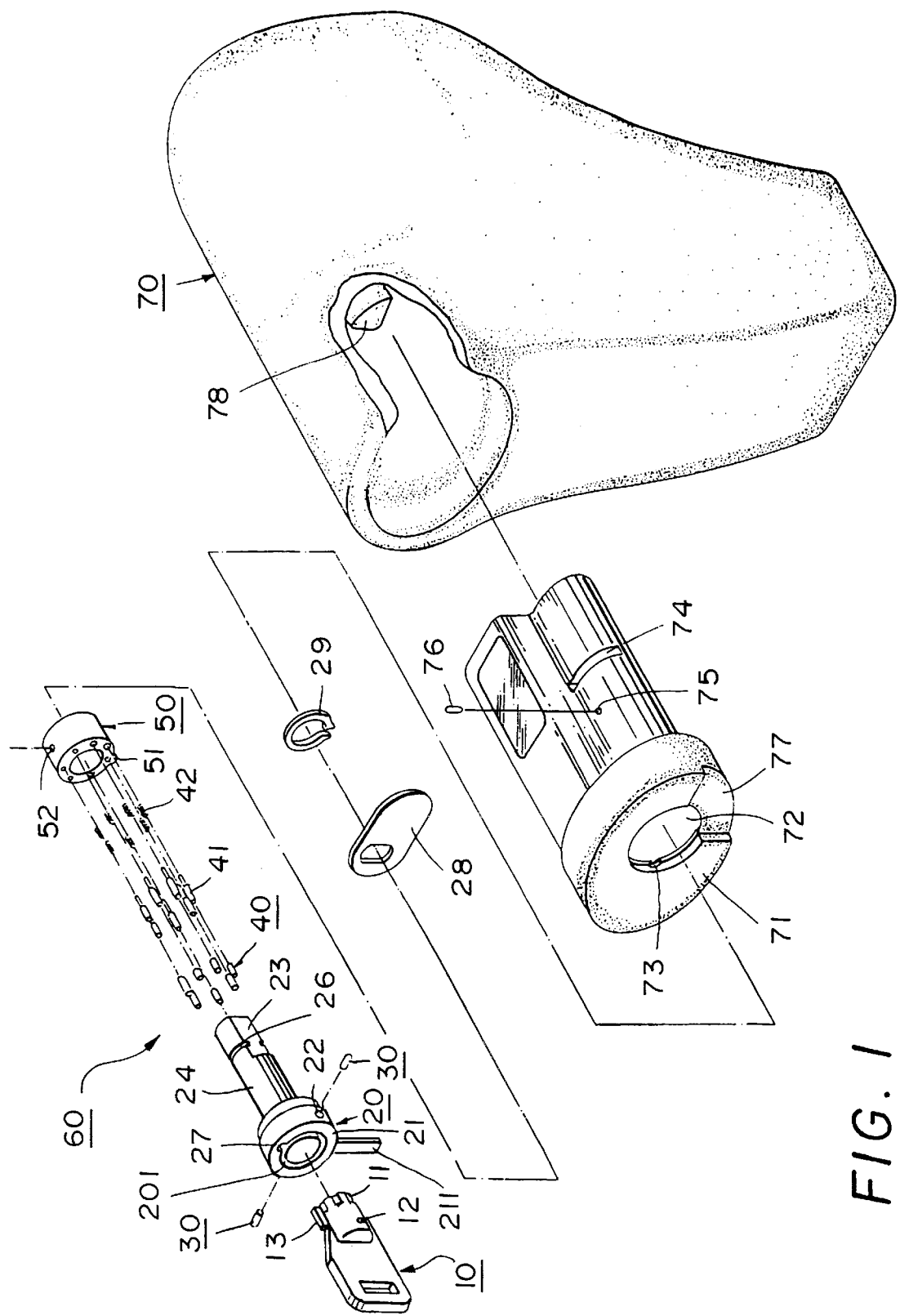
FIG. 1 is an analytical perspective view showing the structure of the present invention.
Figure 2:
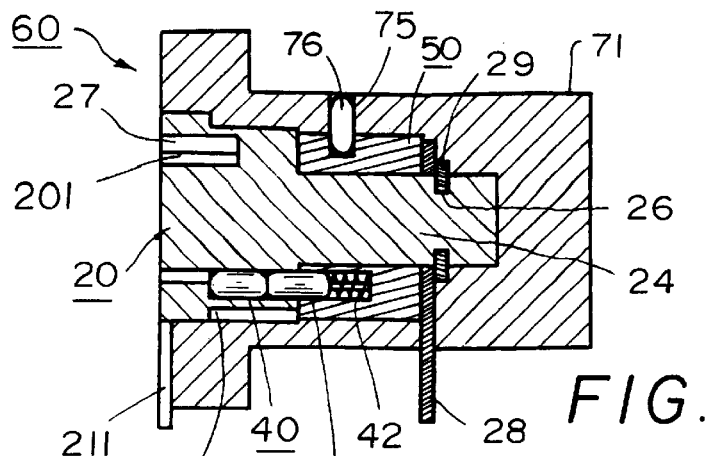
FIG. 2 is a sectional view of the lock of the present invention.
Figure 3:
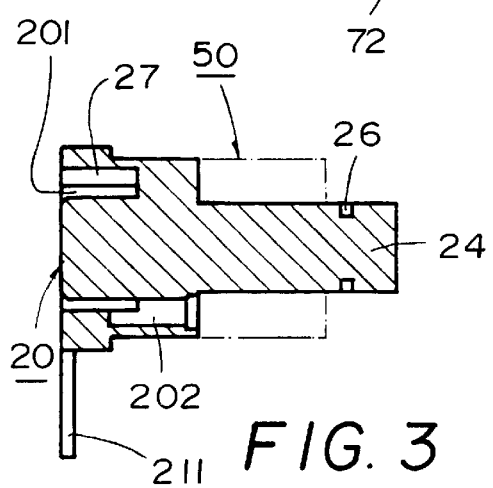
FIG. 3 is a sectional view taking from one end of FIG. 2 showing the structure of the present invention.

Referring to FIGS. 1, 2, and 3, the knob 70 of the improved shift lever lock structure of a car of the present invention is provided with a push button 71 which is provided laterally with a lock core hole 72, the latter is provided therein with a plurality of arciform grooves 73, the rear end of the push button 71 is closed, a slit 74 and a positioning hole 75 for insertion of a positioning pin 76 are provided on a lateral of the push button 71; the lock core hole 72 of the push button 71 is provided for insertion of the lock 60.

Figure 4:
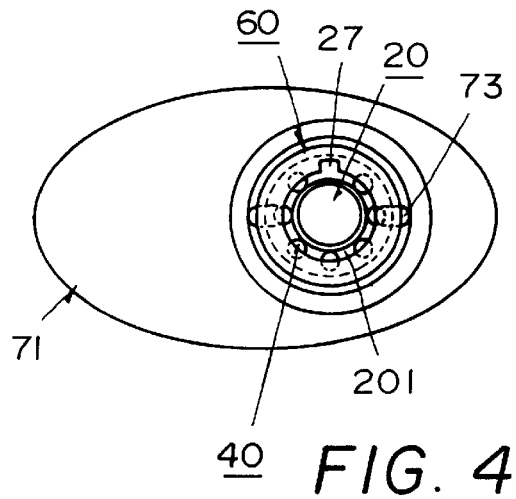
FIG. 4 is a schematic view showing the structure of the upper bead seat (including the lock core) of the present invention.

Referring to FIGS. 1, 3, and 4, the lock 60 of the present invention includes an upper bead seat 20, a lock core 24, a lower bead seat 50, a plurality of upper and lower locking beads 40, 41, a stop sheet 28 and a C shaped ring 29 etc., wherein, the upper bead seat 20 is provided on the center thereof with a post and on the front end thereon with an annular wall 21, a key hole 201 is formed in the annular wall 21, the annular wall 21 is provided with a plurality of (two in this embodiment) pin holes 22 and a pushing rod 211, and is provided inside thereof with a mortise 27, the upper bead seat 20 is provided therebehind with a plurality of bead holes 202 for holding the upper locking beads 40 and is provided at the rear end thereof with the lock core 24 which has on the tailing end thereof two lateral flat planes 23 and has a locking groove 26 on the shank thereof.

The lower bead seat 50 is provided therearound with a plurality of bead holes for receiving a spring 42 and the lower locking beads 41, a protruding portion 51 is provided on the lower end thereof, with the protruding portion 51, the lower bead seat 50 exactly snugly fits the receiving space in the push button 71, thereby the lower bead seat 50 is held firm. When the lower bead seat 50 and the stop sheet 28 are slipped over the lock core 24, the lock core 24 is locked on the locking groove 26 by the C shaped ring 29 to render the upper and lower bead seats 20, 50 and the stop sheet 28 to closely cling one to the others, while the end of the stop sheet 28 can be extended out of the slit 74 of the push button 71. The push button 71 is provided on the exterior surface thereof with the positioning pin 76 (or a screw) and the positioning hole 75, and a round hole 52 is provided correspondingly on the surface of the lower bead seat 50, so that the positioning pin 76 can be extended through the positioning hole 75 on the push button 71 and the round hole 52 of the lower bead seat 50 for securing, therefore, the push button 71 and the lower bead seat 50 can be secured very firmly.

Figure 7:
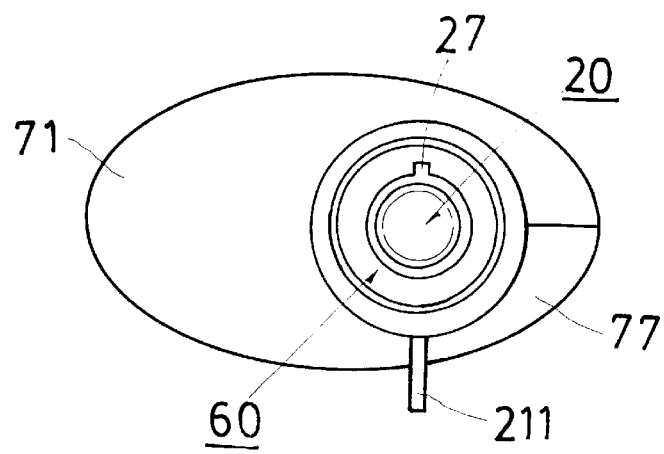
FIG. 7 is a schematic view showing operation of a push rod of the lock of the present invention.
Figure 8:
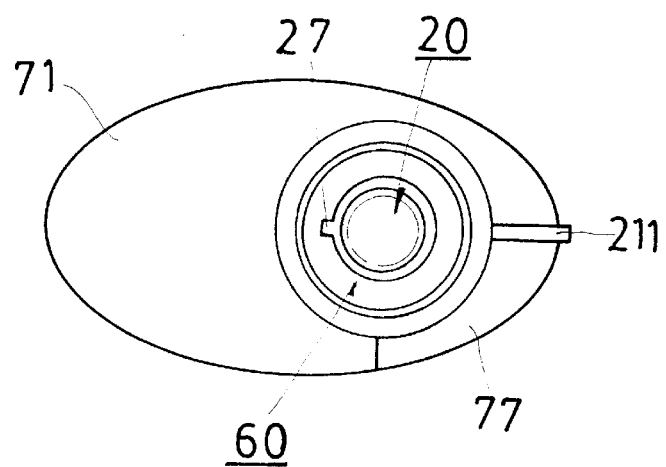
FIG. 8 is another schematic view showing operation of the push rod the lock of the present invention.
Figure 11:
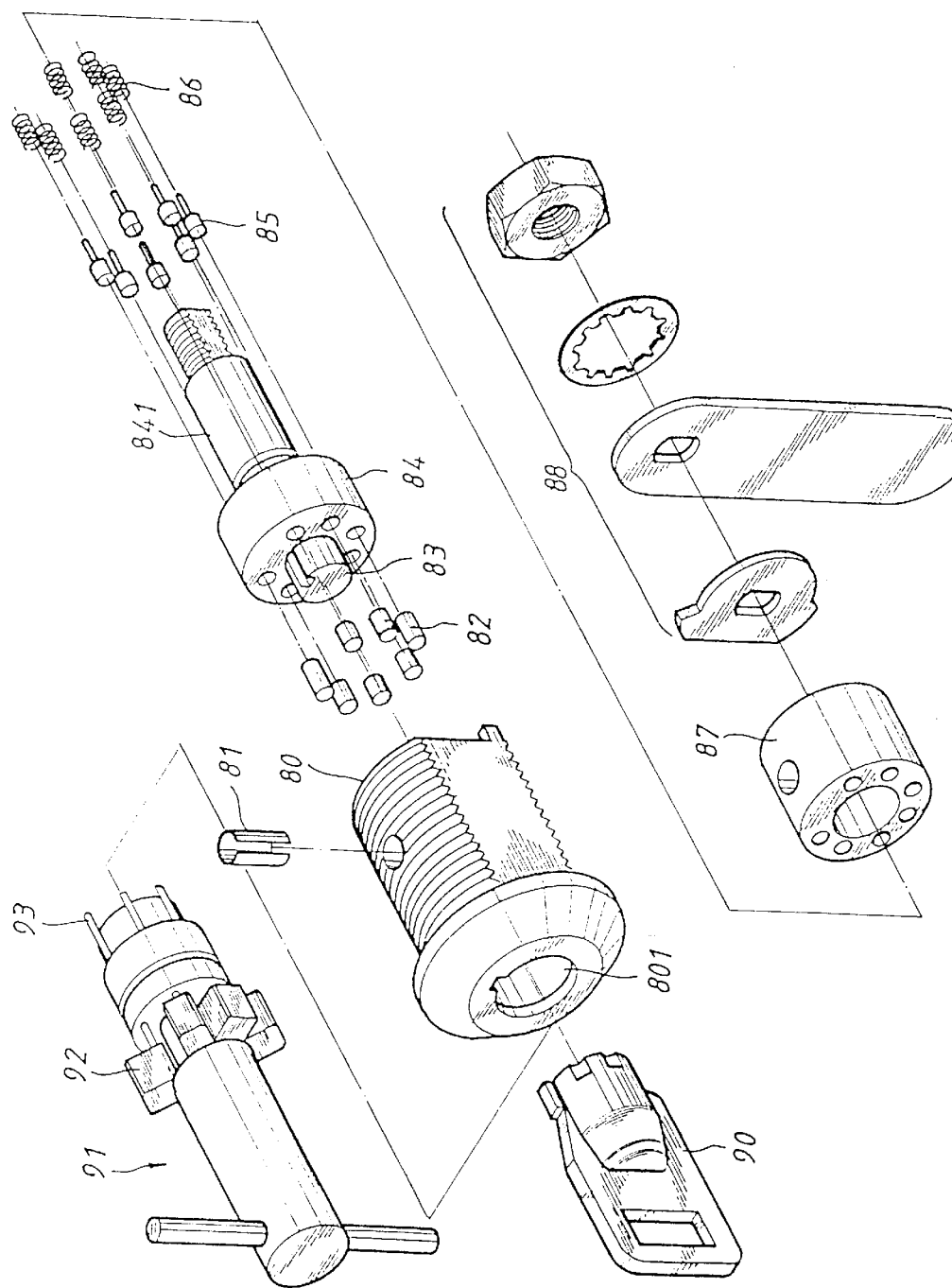
FIG. 11 a perspective view showing the structure of a conventional lock.

Referring now to FIGS. 1, 7, and 8, the annular wall 21 of the upper bead seat 20 of the lock 60 is provided on the exterior surface thereof with the pushing rod 211, when the lock 60 is inserted in the lock core hole 72 of the push button 71, the pushing rod 211 is exactly engaged in a notch 77 on the push button 71, when the pushing rod 211 is rotated, it rotates the upper bead seat 20 and the lock core 24, thereby, the stop sheet 28 connected on the rear end of the lock core 24 is rotated to the position where a stop block 78 in the knob 70 is located, such as is shown in FIG. 9. The stop block 78 of the knob 70 can be provided with a groove 79 for receiving and fixing of the stop sheet 28 therein, thereby the push button 71 can be prevented from being pressed (as showin in FIG. 10).

Figure 5:
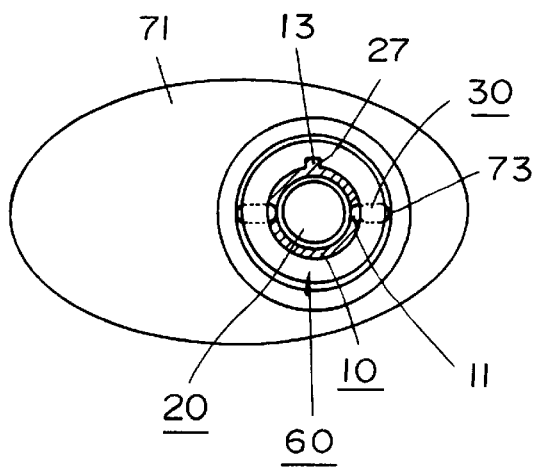
FIG. 5 is a sectional view showing a key inserting into the lock of the present invention.

Referring to FIGS. 1, 3, and 5, a plurality of pins 30 which are rounded on both ends thereof are provided in the pin holes 22 on the lateral periphery of the upper bead seat 20, and a plurality of arciform grooves 73 are provided in the push button 71 at the positions corresponding to those of the pin holes 22, thus the pins 30 can be held between the pin holes 22 and the arciform grooves 73; a key 10 is provided with a shank 11 having a plurality of grooves and with an engaging tenon 13, a plurality of round grooves 12 are provided on the lateral of the shank 11 corresponding in position to the pin holes 22 of the upper bead seat 20.

Figure 6:
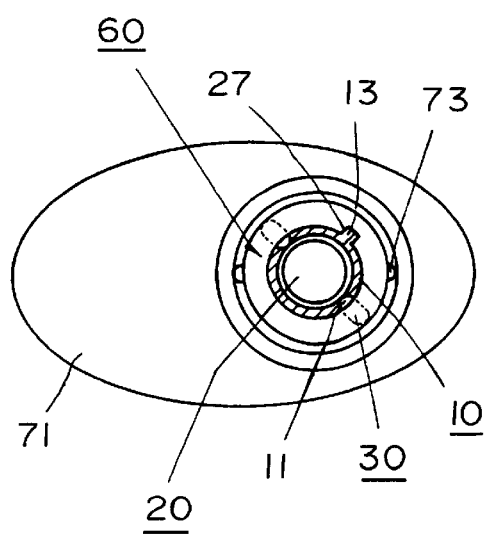
FIG. 6 is a schematic view showing the key inserting and rotating in the lock of the present invention.

When the key 10 is inserted into the key hole 201, the engaging tenon 13 is exactly located in the mortise 27 of the upper bead seat 20, when the key 10 is rotated, the engaging tenon 13 moves the upper bead seat 20 to rotate it, by virtue that the pins 30 are rounded on both ends thereof, therefore, when the upper bead seat 20 rotates while the push button 71 keeps unmoved, the arciform grooves 73 push the pins 30 outwardly, the pins 30 received in the pin holes 22 of the annular wall 21 and the round grooves 12 of the key 10 thereby are rotated as shown in FIG. 6, and thereby the upper and lower locking beads 40, 41 and the lock 60 can be rotated.

In conclusion, by the special design stated above, the improved shift lever lock structure of the present invention has the following advantages in practice:

1. The rear end of the push button of the present invention is closed, all the members are installed from the front end of the push button, so that the lock is very difficult to be opened by rapping of a thief from the front thereof, thus it has a better theft-proof effect.

2. The lower bead seat 50 of the present invention is more firmly secured by using a positioning pin 76 and by snug fitting between the protruding portion 51 of the lower bead seat 50 and the push button 71, and moreover, the lock core 24 can be mounted with a C shaped ring 29 to lock the lower bead seat 50 and the stop sheet 28; so that the lock structure is very firm in a whole, the lock core 24 can be prevented from being taken out of the front surface by clamping.

3. The lock 60 of the present invention is endued with a special locking function by providing the stop sheet 28 and the stop block 78, it can not be opened with a common master key, therefore it is very safe.

4. The lower bead seat 50 of the present invention is not fixed by rivetting on the push button 71, it can be removed by taking off the positioning pin 76 after being used for a period of time, and the lock core 24 is removed, and the upper and the lower locking beads 40, 41 are re-allocated to get a new set of locking code (i.e., the teeth of the key should be changed), in this way, the lock is much safer.

Such an improved shift lever lock structure is novel and practical, therefore, what I claim as new and desire to be secured by Letters Patent of the United States are:

1. An improved shift lever lock structure of a car including:

a push button which is provided on a lateral portion thereof with a lock core hole, the lock core hole is provided therein with a plurality of arciform grooves, said lock core hole includes a notch; a slit and a positioning hole for insertion of a positioning pin are provided on the lateral portion of said push button, said slit is in communication with said lock core hole, for the insertion of said positioning pin;

a lock including an upper bead seat, a lock core, a lower bead seat, a plurality of upper and lower locking beads, a stop sheet and a C shaped ring, wherein, said upper bead seat is provided with an annular wall which is provided with a plurality of pin holes corresponding in position to said arciform grooves of said push button, a plurality of pins which are rounded on both ends thereof are provided in said pin holes provided on the lateral periphery of said upper bead seat, said annular wall is provided on the exterior surface thereof with a pushing rod which rotates said upper bead seat and lock core, when said upper bead seat and said lower bead seat are connected together, said stop sheet is positioned on said lock core and engages the rear end of said lower bead seat, then said C shaped ring is locked in a locking groove on said lock core, thus said stop sheet, said upper bead seat and said lower bead seat form together said lock;

said lock is inserted into said lock core hole of said push button, said stop sheet of said lock is extended out of said slit of said push button, said pushing rod is engaged in said notch on said push button, and said positioning pin is extended through said positioning hole on said push button and a round hole on said lower bead seat for securing said lock in said push button, whereby when said pushing rod is rotated, it will cause rotation of said upper bead seat and lock core through rotation of said annular wall, consequently, said stop sheet connected on said lock core is rotated to a communicating position with a stop block located in a knob, such that said push button being locked is prevented from being pressed, whereby to unlock the lock, a key having a lateral portion on a shank thereof is inserted into said lock core of said lock, said key is provided on it's lateral portion with a plurality of rounded grooves, wherein said arciform grooves push out said rounded pins, said rounded pins reside in said pin holes on said annular wall and engage with said round grooves of said key, which allows the lock core of said lock to be rotated by said key.

2. An improved shift lever lock structure of a car as in claim 1, wherein:

said push button is provided on the bottom thereof with a guide groove, and said lower bead seat is provided on the lower end thereof with a protruding portion, said protruding portion can be engaged with said guide groove for limitation of movement.

* * * * *